United States Patent
Baer

(10) Patent No.: US 8,953,094 B2
(45) Date of Patent: Feb. 10, 2015

(54) ILLUMINATION SYSTEM

(75) Inventor: Richard L. Baer, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 13/293,936

(22) Filed: Nov. 10, 2011

(65) Prior Publication Data
US 2013/0120636 A1 May 16, 2013

(51) Int. Cl.
H04N 5/222 (2006.01)
G03B 15/05 (2006.01)
H04N 5/235 (2006.01)
H04N 5/232 (2006.01)

(52) U.S. Cl.
CPC .............. *G03B 15/05* (2013.01); *H04N 5/2354* (2013.01); *H04N 5/23206* (2013.01); *G03B 2215/0557* (2013.01)
USPC .......................................... 348/371; 396/155

(58) Field of Classification Search
CPC ........................... H04N 5/2256; H04N 5/2354
USPC ......... 348/211.99, 211.11, 211.3, 211.4, 370, 348/371; 396/4, 61, 62, 155, 157, 164, 182
See application file for complete search history.

(56) References Cited

U.S. PATENT DOCUMENTS

| | | | |
|---|---|---|---|
| 6,127,940 A * | 10/2000 | Weinberg | 340/12.22 |
| 6,204,877 B1 | 3/2001 | Kiyokawa | |
| 6,947,666 B2 * | 9/2005 | Chapman et al. | 396/4 |
| 7,046,292 B2 | 5/2006 | Ziemkowski | |
| 7,764,880 B2 * | 7/2010 | Hamada | 396/157 |
| 7,775,575 B2 * | 8/2010 | Clark | 296/56 |
| 7,877,005 B2 * | 1/2011 | Okubo | 396/56 |
| 8,488,954 B2 * | 7/2013 | Delzell | 396/4 |
| 2002/0127019 A1 * | 9/2002 | Ogasawara | 396/661 |
| 2007/0153090 A1 | 7/2007 | Liow et al. | |
| 2007/0254640 A1 * | 11/2007 | Bliss | 455/420 |
| 2010/0202767 A1 * | 8/2010 | Shirakawa | 396/56 |
| 2012/0051726 A1 * | 3/2012 | King | 396/4 |

OTHER PUBLICATIONS

Author Unknown, "Duplicam for iPad," DanCreek Design, http://www.dancreek.com/apps.html, 1 page, at least as early as Oct. 10, 2011.

* cited by examiner

*Primary Examiner* — Aung S Moe
*Assistant Examiner* — Chriss Yoder, III
(74) *Attorney, Agent, or Firm* — Wong, Cabello, Lutsch, Rutherford & Brucculeri, LLP

(57) ABSTRACT

A method for capturing an image with an image capture device, such as a camera or mobile electronic device. The method includes initiating a master-slave relationship between the image capture device and at least one secondary device. Once the master-slave relationship is initiated, remotely activating one of an at least one light source of the at least one secondary device. As the light source is activated, capturing a test image of a scene illuminated by the at least one light source by the image capture device. Then, analyzing the test image to determine if an illumination of the scene should be adjusted and if the illumination of the scene is to be adjusted, providing a control signal to the at least one secondary device including at least one of a position instruction, an intensity level, or timing data.

20 Claims, 14 Drawing Sheets

ILLUMINATION SYSTEM

TECHNICAL FIELD

The present invention relates generally to using multiple strobes to provide lighting for a scene to be captured by a camera.

BACKGROUND

Many cameras include a strobe or flash for capturing photographs or images in low light. The range of these integrated flashes may be limited. For example, a typical flash may have a light intensity that decreases by a square of the distance from the source. Use of these integrated flashes may lead to photographs having harsh foreground lighting but poor or no background lighting since the flash originates from the camera and may cast strong shadows as light intensity decreases with a square of the distance from the camera. Additionally, corners of a captured image may have a significant decrease in intensity as the width of the flash may be limited.

Additionally, many photographs taken by cameras having an integrated flash may show the "red-eye" phenomenon, where the subject's eyes appear red. This occurs because the flash is typically located near a lens of the camera, and thus a person or animal may be facing the flash as the image is taken. Red-eye reflections are typically due to light from the flash being focused straight on a person or animal and, due to the high frequency of the flash, the eye does not have time to close. This results in light from the flash being reflected off a retina of the person or animal's eye; this reflected light is then captured by the camera. Increasing a separation between the flash and the lens can decrease the occurrence of red-eye reflections. However, in small cameras or devices (e.g., smart phones with an integrated camera) this may be difficult to achieve.

SUMMARY

Examples of embodiments described herein may take the form of a method for capturing an image with an image capture device, such as a camera or mobile electronic device. The method includes initiating a master-slave relationship between the image capture device and at least one secondary device. Once the master-slave relationship is initiated, remotely activating one of an at least one light source of the at least one secondary device. As the light source is activated, capturing a test image of a scene illuminated by the at least one light source by the image capture device. Then, analyzing the test image to determine if an illumination of the scene should be adjusted. If the illumination of the scene is to be adjusted, providing a control signal to the at least one secondary device including at least one of a position instruction, an intensity level, or timing data.

Other embodiments may take the form of an electronic device. The electronic device includes a lens, an image sensor in optical communication with the lens, and a processor in communication with the image sensor. The electronic device further includes a communication mechanism in communication with the processor and configured to transmit and receive a control signal to one or more secondary devices. The control signal controls a light source of the one or more secondary devices.

Still other embodiments may include a method for capturing an image of a scene with an image capture device. The method may include initiating a master-slave relationship between the image capture device and an at least one secondary device including a remote light source. When the master-slave relationship has been initiated, remotely activating a remote light source of the secondary device. As the remote light source is activated, capturing a first image of the scene illuminated by the remote light source. Then, constructing a flash map corresponding to the secondary device.

SPECIFICATION

Figure 1A:
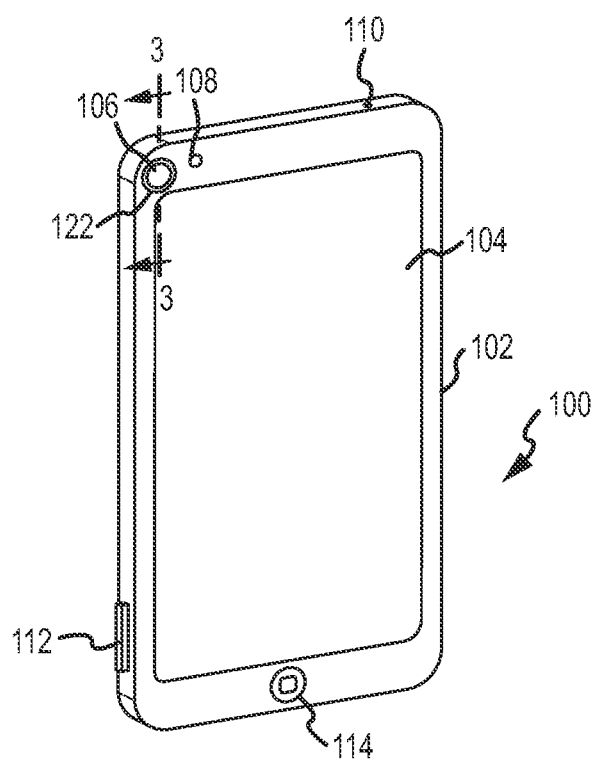
FIG. 1A is a front perspective view of a first embodiment of an image capture device.

Some embodiments described herein may take the form of an illumination system. The illumination system may include an image capture device and one or more secondary (or "slave") devices, each including one or more light sources. The light sources of each secondary device may be activated by the image capture device in order to illuminate a scene prior to the image capturing device taking an image of the scene. In one example, the image capture device communicates with each secondary device and, as the image capture device is about to capture an image of the scene, each secondary device activates its light source. The image capture device may automatically adjust the timing and/or intensity of each secondary device or a user may manually adjust an intensity and/or timing of the light sources.

Furthermore, the image capture device may provide instructions to a user regarding the placement of each secondary device around a particular scene in order for a desired illumination in a captured image. Likewise, the image capture device may relay such instructions to persons interacting with each of the secondary devices. These relayed instructions may be personalized for each different secondary device. In some embodiments, the instructions may control timing, intensity, duration, and/or angle of the flash. The instructions may also be visible to the persons interacting with each secondary device and may contain instructions for the persons. As one example, a display associated with (or incorporated into) a secondary device may display text instructing a person holding that device to move in a particular direction, for a particular distance, to angle or move the device in a certain manner, and so forth. The secondary device may track its orientation and/or position in absolute or relative terms and determine if the instructions have been followed. This information, in turn, may be relayed to the image capture device. In some embodiments, the image capture device may delay taking an image until all secondary devices relay to it data confirming the instructions have been followed.

In one embodiment, the image capture device and the slave devices are mobile electronic device such as smart phones, tablet computers, personal digital assistants, digital cameras and the like. In this embodiment, the image capture device may be the same type of device as the other secondary devices, but act as a master device controlling certain operations of each slave. In another embodiment, the image capture device may be different than the secondary devices. For example, the image capture device may be a camera including a communication mechanism and the secondary devices may be light sources with a communication mechanism. The image capture device may be in communication with the secondary devices wirelessly, e.g., via Bluetooth, WiFi, radio frequency signals, infrared signals and so on. Accordingly, the image capturing device may communicate with each secondary device in order to adjust an intensity of the light sources, the timing of activation of the light sources, and any other desired parameters.

In the embodiments disclosed herein, the light sources may be triggered or activated based on a wireless signal from the image capture device. Similarly, a clock in each secondary device may be synchronized with a clock in the image capture device, and the image capture device may provide a time that each light source should flash. The above embodiments ensure that the secondary devices may only be activated in response to a control signal from the image capture device.

In prior art strobe or flash systems, each strobe may discharge in response to a light pulse, one example of which is a xenon gas flash having an optical detector. Accordingly, in some instances these strobes may accidentally discharge in response to a flash from another camera or another non-system source. By contrast, the secondary devices of the present disclosure generally are in communication with each other and the image capture device via a specific communication mechanism. In some instances, the communication may be over a secured communication path for example, the secondary devices may be paired with the image capture device on a Bluetooth communication system. Thus, the light sources of the secondary devices may be triggered only when desired, such as through a transmitted instruction.

Further embodiments provide a method of providing illumination of a scene in order to capture an image of the scene. The electronic device may capture one or more test images and may analyze each test image in order to determine whether the lighting of the scene should be changed. If the lighting should be altered, the image capture device may communicate with the secondary devices to adjust the timing and/or intensity of the light source for each flash. For example, the image capture device may decrease the intensity of the light sources for secondary devices closer to the image capture device and may increase the intensity of the light sources of secondary devices farther from the image capture device. Thus, the image capture device may capture an image of a scene that is substantially uniformly lit, or otherwise illuminated according to a desired scheme.

In one embodiment, the image capture device may include a user interface allowing a user to selectively adjust the illumination of a scene prior to an image of the scene being captured. In another embodiment, the image capture device may adjust the illumination of the scene substantially automatically, e.g., through image processing techniques.

Furthermore, other embodiments of the present disclosure may include a remote flash device or removable light source for the image capture device. The remote flash device may be incorporated into a charging device for the image capture device, or may otherwise include a connector that may be received within an input port of the image capture device.

The Image Capture Device

Figure 1B:
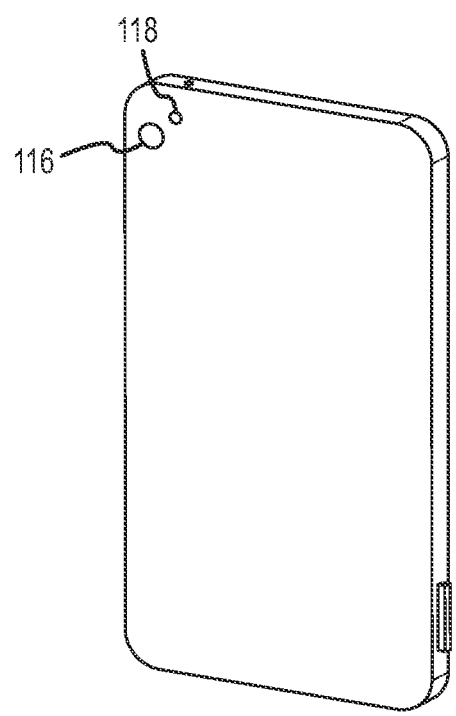
FIG. 1B is a rear perspective view of the image capture device of FIG. 1A.
Figure 2A:
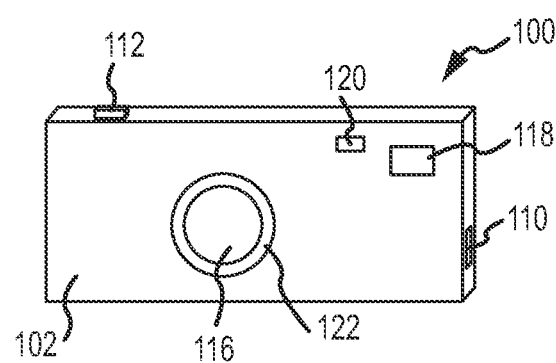
FIG. 2A is a front perspective view of a second embodiment of the image capture device.
Figure 2B:
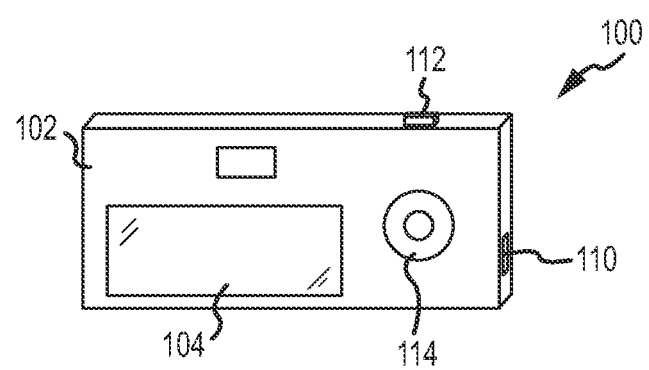
FIG. 2B is a rear perspective view of a the image capture device of FIG. 2A.

The methods and devices described herein can be used with substantially any type of apparatus or device that may capture an image. FIG. 1A is a front perspective view of an example embodiment of an image capture device 100. FIG. 1B is a rear perspective view of the image capture device 100. As shown in FIGS. 1A and 1B, in some instances the image capture device 100 may be a mobile electronic device, such as, but not limited to, a smart phone, digital music player, cellular phone, gaming device, tablet computer, notebook computer and so on. In these instances, the mobile electronic device may have an incorporated camera or image sensing device so as to function as the image capture device. However, in other embodiments, the image capture device may be a stand-alone camera or a camera otherwise incorporated into another type of device. FIG. 2A is a front perspective view of another embodiment of the image capture device 100. FIG. 2B is a rear perspective of the embodiment of image capture device 100 of FIG. 2A.

Referring to FIGS. 1A-2B, the image capture device 100 may include an enclosure 102, a display 104, a camera 106, a light source 108, one or more input mechanisms 112, 114, and an input port 110. The enclosure 102 may at least partially surround components of the image capture device 100 and provides a housing for those components.

The display 104 provides an output for the image capture device 100. For example, the display 104 may be a liquid crystal display, plasma display, a light emitting diode (LED) display, or so on. The display 104 may display images captured by the image capture device, may function as a viewfinder and display images that may be within a field of view of the image capture device. Furthermore, the display 104 may also display outputs of the image capture device 100, such as a graphical user interface, application interfaces, and so on.

The display 104 may also function as an input device in addition to displaying output from the image capture device 100. For example, the display 104 may include capacitive touch sensors, infrared touch sensors, or the like that may track a user's touch on the display 104. In these embodiments, a user may press on the display 104 in order to provide input to the image capture device 100.

The image capture device 100 may include one or more input mechanisms 112, 114. The input mechanisms 112, 114 may be positioned substantially anywhere on the image capture device 100 and provide a mechanism for a user to communicate an input to the image capture device 100. For example, a user may press down on a first input mechanism 112 to indicate that he or she wishes to capture an image of a scene. In another example, the user may select a second input mechanism 114 to provide input to a graphical user interface, an application or the like.

The input port 110 may provide an input for the image capture device 100. The input port 110 may be configured to receive substantially any type of connector, such as but not limited to, a universal serial bus (USB) connector, a tip ring sleeve connector, a micro-USB connector, and so on. There may be multiple input ports 110 spaced around the image capture device 110. For example, a first input port 110 may be configured to receive a charging cable and a second input port 110 may be configured to receive a trip ring sleeve or other audio connector.

Figure 3:
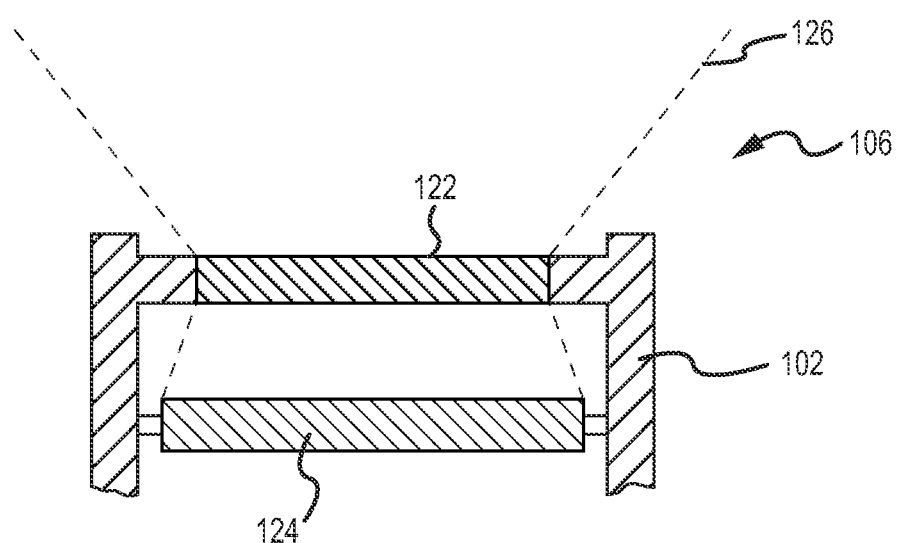
FIG. 3 is a cross-sectional view of the image capture device taken along line 3-3 in FIG. 1A.

The image capture device 100 may also include one or more cameras 106, 116. The cameras 106, 116 may be positioned substantially anywhere on the image capture device 100; and there may be one or more cameras 106, 116 on each device 100. The cameras 106, 116 capture light from an image. FIG. 3 is a cross-sectional view of a first camera 106 in FIG. 1A, taken along line 3-3 in FIG. 1A. However, it should be noted that the cameras 106, 116 may be substantially similar to each other. That said, with reference to FIG. 3, each camera 106, 116 may include a lens 122 in optical communication with an image sensor 124. The lens 122 may be spaced apart from a top surface of the image sensor 124, in this manner light transmitted through the lens 122 may encounter the image sensor 124.

The lens 122 may be substantially any type of optical device that may transmit and/or refract light. In one example, the lens 122 is in optical communication with the sensor 124, such the lens 122 may passively transmit light from a field of view (FOV) 126 to the sensor 124. The lens 122 may include a single optical element or may be a compound lens and include an array of multiple optical elements. In some examples, the lens 122 may be glass or transparent plastic; however, other materials are also possible. The lens 122 may additionally include a curved surface, and may be a convex, bio-convex, plano-convex, concave, bio-concave, and the like. The type of material of the lens as well as the curvature of the lens 122 may be dependent on the desired applications of the system 122. Furthermore, it should be noted that the lens 122 may be stationary within the image capture device 100, or the lens 122 may selectively extend and/or rotate within the image capture device 100.

The image sensor 124 may be substantially any type of sensor that may capture an image or sense a light pattern. The sensor 124 may be able to capture visible, non-visible, infrared and other wavelengths of light. The sensor 124 may be an image sensor that converts an optical image into an electronic signal. For example, the sensor 124 may be a charged coupled device, complementary metal-oxide-semiconductor (CMOS) sensor, or photographic film. The sensor 124 may be in optical communication or electrical communication with a filter that may filter select light wavelengths, or the sensor 124 itself may be configured to filter select wavelengths, e.g., the sensor may include photodiodes only sensitive to certain wavelengths of light.

Referring again to FIGS. 1A-2B, the image capture device 100 may also include a light source 108, 118 or strobe. The light source 108, 118 may be substantially any type of device that may produce light, such as but not limited to, a LED, light bulb, or a flash tube or other electrical arc device (e.g., xenon strobe). The light source 108, 118 selectively illuminates a scene or parts of a scene within the FOV 126 of the lens 122. The light sources 108, 118 may be positioned near the lens 122; however, in other embodiments, the light source 108, 118 may be spaced apart from the lens 122. That is, the light source 108 may be a separate attachment for the image capture device 100 such as a detached flash attachment (see, e.g., FIGS. 11A and 11B).

Figure 4:
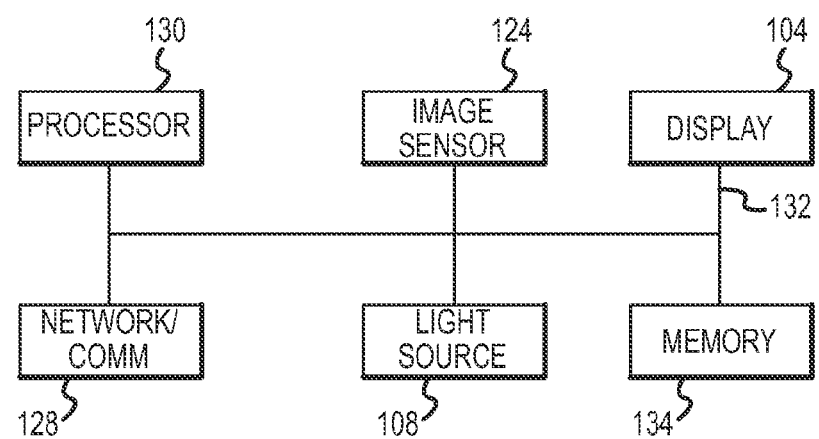
FIG. 4 is an example block diagram of the image capture device.

The image capture device 100 may also include additional components for processing images and communicating with additional devices. FIG. 4 is a block diagram illustrating select components of the image capture device 100. The image capture device 100 may also include a communication mechanism 128 or network/communication interface, a processor 130, and memory 134. Additionally, select components of the image capture device 100 may be in communication via one or more system buses 132.

The communication mechanism 128 may receive and transmit various electrical signals. The communication mechanism 128 may be used to send and receive data from secondary devices, as discussed in more detail below with respect to FIG. 5. Additionally, the communication mechanism 128 may be used to place phone calls from the image capture device 100, may be used to receive data from a network, or may be used to send and transmit electronic signals via a wireless or wired connection (e.g., Internet, WiFi, radio waves, Bluetooth, or Ethernet). In one embodiment, the communication mechanism 128 may include a transmitter in communication with the processor 130 to send data to other devices and a receiver configured to receive signals from other devices.

The processor 130 may control operation of the image capture device 100 and its various components. The processor 130 may be in communication with the display 104, the communication mechanism 128, the memory 134, and may activate and/or receive input from the image sensor 124 as necessary or desired. The processor 130 may be any electronic device cable of processing, receiving, and/or transmitting instructions. For example, the processor 130 may be a microprocessor or a microcomputer. Furthermore, the processor 130 may also adjust settings on the image sensor 124, adjust an output of the captured image on the display 104, may adjust a timing signal of the light source 108, 118, analyze images, and so on.

Illumination System

Figure 5:
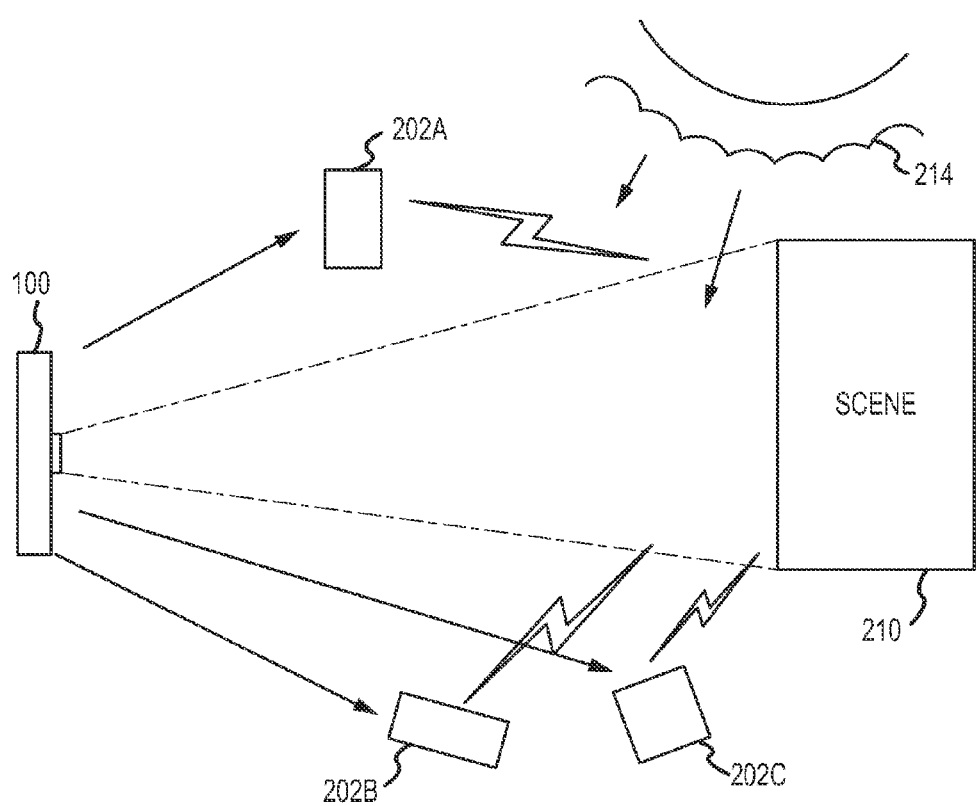
FIG. 5 is a top elevation view of an illumination system utilizing the image capture device.

The image capture device 100 may provide signals and/or may control a series of secondary devices in order to illuminate a scene within the FOV 126. FIG. 5 is a top plan view of a diagram illustrating an illumination system 200 utilizing the image capture device 100. The system 200 may include the image capture device 100 and one or more secondary devices 202A, 202B, 202C. The image capture device 100 may function as a master device and may control or provide signals relating to certain aspects of the secondary devices 202A-202C. Thus, the secondary devices 202A-202C may be slave devices to the image capture device 100. In one example, the image capture device 100 may control a light source of each secondary device 202A-202C to provide a desired illumination of the scene.

In some embodiments the secondary devices 202A-202C may be substantially the same as the image capture device 100. For example, the secondary devices 202A-202C may be smart phones, tablet computers, mobile electronic devices, digital cameras, and the like. In these embodiments, the "master" device and the "slaves" or secondary devices may be chosen based on something other than the components of the each device, e.g., a position of each device with respect to a scene, user preference, and so on.

Figure 6:
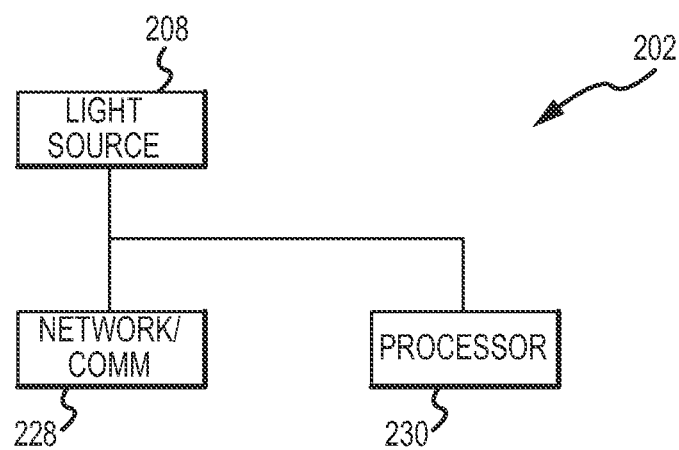
FIG. 6 is a block diagram of a secondary device of the illumination system.

However, in other embodiments, the secondary devices 202A-202C may be different from the image capture device 100. For example, the secondary devices 202A-202C may be single light sources, such as a xenon or other type of light strobe. FIG. 6 is a block diagram of an example secondary device 202. Each secondary device 202 may include a light source 208, a processor 230, and a communication mechanism 228. Each of the illustrated components may be substantially the same as the corresponding components of the image capture device 100. Alternatively, in some embodiments, the light source 208 of the secondary devices 202A-202C may produce a more intense light than light source 108 in the image capture device 100. For example, the light source 208 of the secondary devices 202A-202C may be a xenon strobe light whereas the light source 108 for the image capture device 100 may be a LED. Similarly, the processor 230 of the secondary device 202 may have reduced capabilities as compared with the processor 130, this may allow the secondary devices 202A-202C to use less power as compared with the image capture device 100.

Returning now to FIG. 5, the system 200 may provide enhanced illumination of a scene within the FOV 126 of the image capture device 100. The image capture device 100 may initiate control of the secondary devices 202A-202C. For example, the image capture device 100 and the secondary devices 202A-202C may each have an illumination application and the user may select a master device, that becomes the image capture device 100, and one or more slave devices that become the secondary devices 202A-202C.

Once the image capture device 100 and secondary devices 202A-202C are selected, the secondary devices 202A-202C may be tied or paired with the image capture device 100 and optionally the other secondary devices 202A-202C. In one embodiment, the secondary devices 202A-202C may include a program or application that may be activated to provide a connection to the image capture device 100. In this embodiment, the secondary devices 202A-202C may include the same application or program as the image capture device 100, but may have been selected as the "slave" devices. The secondary devices 202A-202C may be tied to the image capture device 100 when the program or application is activated on each particular device 202A-202C.

In another embodiment, the secondary devices 202A-202C may receive a coded control signal to set them into a "slave" mode. In this embodiment, the secondary devices 202A-202C may be configured to first require a user input prior to accepting such control signals or messages. The slave mode could be built into an operating system of the devices 202A-202C or may built into a program or application running on the devices 202A-202C.

In yet another embodiment, the image capture device 100 and the secondary devices 202A-202C may be paired together through a protocol such as Bluetooth or across network such as WiFi, such that secondary devices 202A-202C may be associated with and controlled by the image capture device 100. In this embodiment, the secondary devices 202A-202C and the image capture device 100 may share a link key, control word, password, and so on to allow them to communicate to each other, as well as to allow the image capture device 100 to function as a master for the secondary devices 202A-202C.

Once the secondary devices 202A-202C are paired with the image capture device 100, the image capture device 100 may transmit and receive commands and/or other signals to and from the secondary devices 202A-202C. In one embodiment, the image capture device 100 may provide controls for activating the light source 208 of each secondary device 202A-202C. For example, the image capture device 100 may determine the activation time, the activation duration, the light intensity, and the like of the light source 208 for each particular secondary device 202A-202C.

Furthermore, the image capture device 100 may also transmit signals that may cause the secondary devices 202A-202C to display a certain message. In embodiments where the secondary devices 202A-202C are mobile electronic devices, the image capture device 100 may transmit instructions for a user supporting the device. For example, if a particular secondary device 202A-202C is too close to the image capture device 100, the image capture device 100 may transmit directions related to a new position, e.g., move 10 feet away from the image capture device 100.

In one example, the image capture device 100 may transmit the control signals over the network to each of the secondary devices 202A-202C. Each secondary device 202A-202C may examine the signal to determine if it contains a unique identifier. If the signal contains the unique identifier, the secondary device may determine that it is an intended recipient of the signal and processes it accordingly. In other embodiments, such protocols may be established through the initial contact and transmissions between the image capture device 100 and secondary device(s) 202A-202C.

In a second example, the image capture device 100 may transmit the control signals to each specific device. In this example, the control signal may not include a specific identifier as it may be sent directly to one or more select secondary devices 202A-202C.

In a third example, the image capture device 100 may transmit at least one control signal as a light signal. For example, the light source 108 of the image capture device 100 may send a pre-flash sequence of light flashes to indicate to the secondary devices 202A-202C to activate their respective light sources 208. In this example, the secondary devices 202A-202C may include an optical detector or sensor, such as a photodiode, or a camera (if included) in each of these devices 202A-202C. It should also be noted that the image capture device 100 may provide controls to the secondary devices 202A-202C in substantially any other manner and the aforementioned examples are meant to be examples only.

As shown in FIG. 5, the secondary devices 202A-202C may be positioned around a scene 210 (e.g., a landscape, object(s), person(s)) to be captured by the image capture device 100. As used herein "scene" refers to any background and/or objects within the FOV 126 of the image capture device 100 and "image" refers to a digital representation of the scene. The position of the secondary devices 202A-202C may be determined by one or more users, who may position the secondary devices 202A-202C according to an instruction from the image capture device 100 or their own wishes. In some embodiments, the secondary devices 202A-202C may relay their relative or actual position and/or angular placement to the image capture device 100. For example, the secondary devices 202A-202C may include one or more accelerometers, gyroscopes, or global positioning devices in order to determine their angle and position.

The secondary devices 202A-202C provide light to illuminate the scene 210 as well as to counteract or balance out a background light source 214. In this manner, an image captured by the image capture device 100 may have substantially uniform illumination, such that shadows and/or clipping (e.g., light intensity exceeding a display or capture threshold) may be eliminated.

Furthermore, in some embodiments, the light source 108 of the image capture device 100 may not provide light for the captured image. In these embodiments, the chance that an image of a person or animal including a red-eye reflection may be reduced. This is because the light sources 208 may be positioned off-center from the person of animal as the image is captured by the image capture device 100. Red-eye reflections, as described above, are typically due to light being positioned directly towards an eye of a person or animal and reflecting back off the eye. Also, the light sources 208 of the secondary devices 202A-202C may also be laterally spaced apart form the lens 122 to further enhance the picture quality and reduce red-eye reflections.

Figure 7:
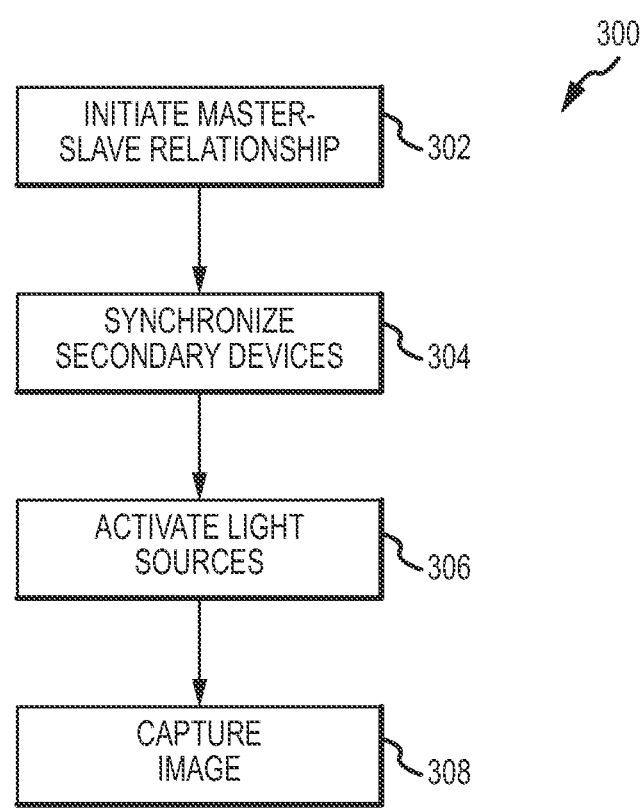
FIG. 7 is a flow chart illustrating an example method for capturing an image.

An example method for capturing an image via the illumination system 200 will now be discussed in more detail. FIG. 7 is flow chart of an example method for capturing an image. The method 300 may begin with operation 302 and the image capture device 100 may initiate communication with the secondary devices 202A-202C. For example, as previously described above, the secondary devices 202A-202C and the image capture device 100 may pair with one another or otherwise provide a communication mechanism so that the image capture device 100 may provide at least one control signal to the secondary devices 202A-202C. In some embodiments, the relationship may be initiated with each device 100, 202A-202C independently That is, a user may initiate an application on each device.

After a relationship between the image capture device 100 and the secondary devices 202A-202C has been established, the method 300 may proceed to operation 304. During operation 304, the image capture device 100 may synchronize the secondary devices 202A-202C. For example, an internal clock for the image capture device 100 may be synchronized with an internal clock of the secondary devices 202A-202C, e.g., via reference broadcast synchronization, a protocol such as IEEE 1488, network time protocol, and so on.

In another example, the image capture device 100 may provide a pre-flash sequence in order to synchronize the secondary devices 202A-202C. For example, the light source 108 may emit a light flash prior to capturing the image. The secondary devices 202A-202C may detect the light flash (through a light sensor) and prepare to initiate their respective light sources 208, which may be substantially instantaneously after detecting the light flash.

Once the secondary devices 202A-202C are synchronized with the image capture device 100, the method 300 may proceed to operation 306. In operation 306, the secondary devices 202A-202C activate their respective light sources 208. Optionally, the image capture device 100 may also activate its light source 108. The activation of each light source 108, 208 may depend on the device, but generally may include emitting a flash of light, or otherwise providing illumination.

As the light sources 108, 208 are activating the method 300 proceeds to operation 308 and the image capture device 100 captures an image of the scene 210. In one embodiment, light from the scene 210 (including the background light 214, if any) and the light from the secondary devices 202A-202C is transmitted through the lens 122. The light is then captured by the image sensor 124 and may be converted into an electrical signal.

The illumination system 200 and the image capture method 300 may increase the quality of images captured by the image capturing device 100. This is because the secondary devices 202A-202C may be laterally separated from the image capture device 100, which may reduce the likelihood of a person or animal within the scene from having a red-eye reflection in the captured image. Additionally, the secondary devices 202A-202C provide light sources 208 at different distances and options from the image capture device 100, allowing light from each secondary device 202A-202C to fill in gaps in each other devices 202A-202C beam pattern, as well as extend the lit-range that may be captured by the image capture device 100.

Furthermore, in embodiments where the image capture device 100 may transmit signals to the secondary devices 202A-202C via an electronic signal, the light sources 208 may be substantially prevented from firing prematurely, By contrast, conventional flash strobes that may be optically triggered maybe triggered accidentally. For example, many photographs use optically triggered strobes that may trigger in response to another signal, e.g., a second camera, lightening, etc.

Adjusting the Light Intensity and Duration

The illumination system 200, as shown in FIG. 5, may be used to vary the light intensity, overall image exposure, and/or light positioning for an image captured by the image capture device 100. As discussed above, the image capture device 100 may provide more than one control signal to the secondary devices 202A-202C. The additional control signals may vary the intensity, timing, and/or directions with to move a location of the light sources 208.

Figure 8:
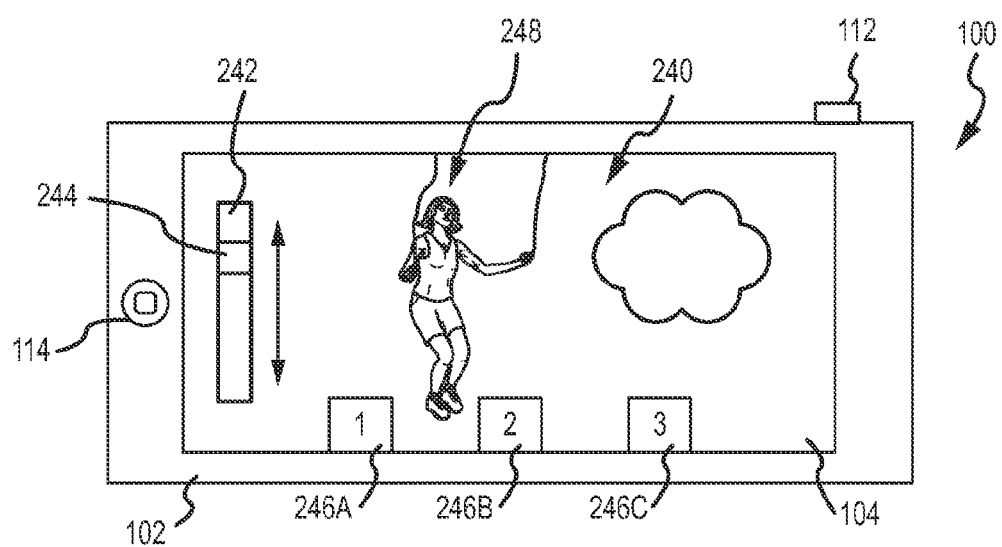
FIG. 8 is a front elevation view of the image capture device of FIG. 1A displaying a graphical user interface.

In one example, the image capture device 100 may display a graphical user interface (GUI) on the display 104 so that a user can selectively adjust the illumination and/or timing of the light sources 208 of the secondary devices 202A-202C. FIG. 8 is a front plan view of the image capture device 100 illustrating an example GUI 240. The GUI 240 may include an image 248 of the scene 210, a control icon 242, a controller 242, as well as a secondary device indicator 246A, 246B, 246C for each secondary device 202A-202C in communication with the image capture device 100. It should be noted that the GUI 240 illustrated in FIG. 8 is one example only, and other displays and controllers are envisioned.

The image 248 of the scene 210 displayed on the GUI 240 may be an actual image captured by the image sensor 124 or a sample image that may be captured by the image sensor 124. For example, the captured image 248 may be a previously taken photograph or may be a view of a sample photograph, e.g., as viewed by the lens 122 prior to actually capturing the image. Accordingly, the user may adjust the light sources 208 to effect a new image of the scene 210. In some embodiments, the GUI 240 may be displayed on the display 104 of the image capture device 100, on one or more of the secondary devices 202A-202C, and/or on another computing device (e.g., laptop, desktop) in communication with the image capture device 100.

The GUI 240 may also include the control icon 242 and controller 244. The control icon 242 may be represented as substantially any type of icon, and in one embodiment as shown in FIG. 8 may be a bar. The controller 244 may be moved with respect to the icon 242 to adjust a particular setting. For example, the control icon 242 may correspond to an intensity of a particular light source (e.g., light sources 108, 208), and as a user manipulates the controller 244 the intensity level for the light source may vary. In this example, a first end of the control icon 242 may be a high intensity and a second end of the control icon 242 may be a low intensity, and depending on the placement of the controller 244, the intensity level for the particular light source is varied.

In some embodiments, as the controller 244 is moved, the displayed image 248 may adjust correspondingly. For example, as the intensity of the light source 208 for a particular secondary device 202A-202C is increased, the brightness of the portions of the image illuminated by that secondary device 202A-202C may be increased. In this manner, the user may be able to see how the adjustment may affect the eventually captured image. This may allow the use to better be able to determine how to adjust a particular light source in order to achieve a desired image.

The GUI 240 also may include an indicator 246A-246C for each secondary device 202A-202C and/or the image capture device 100. In this manner, the user may select the particular device in which to adjust the light source. For example, the user may select the first indicator 246A which may correspond to the first secondary device 202A and as the user moves the controller 244 in a particular manner, the intensity of the light source 208 of the first secondary device 202A may be adjusted accordingly. After the user has selected completed adjusting the particular device, the image capture device 100 may transmit a control signal to the particular secondary device 202A-202C with the new control information. In another example, the image capture device 100 may transmit all of the control signals or information simultaneously to each of the secondary devices 202A-202C.

Furthermore, the GUI 240 may also display relative distance instructions with respect to the position of the secondary devices 202A-202C, as well as an example image of the scene as each secondary device 202A-202C is positioned in a different location. For example, the image capture device 100 may receive positioning data for each secondary device 202A-202C. The positioning data may correspond to a location of the secondary device 202A-202C with respect to the scene 210 or the image capture device 100 and may include an angle of the secondary device 202A-202C. Thus, a user may be able to not only determine how the intensity of the light sources 208 may affect a captured image of the scene, but also how the positions of each secondary device 202A-202C may affect the captured image.

It should be noted that the GUI 240 may present controls for substantially any type of parameter of the image, image capture device 100, or secondary devices 202A-202C. For example, the user may be able to control an exposure length of light through the lens 122 of the image capture device 100, a color of a particular light source (e.g., the devices may include multiple colored lights), the timing of the activation of a particular light source, a color filter for the image sensor 124, and so on.

Figure 9:
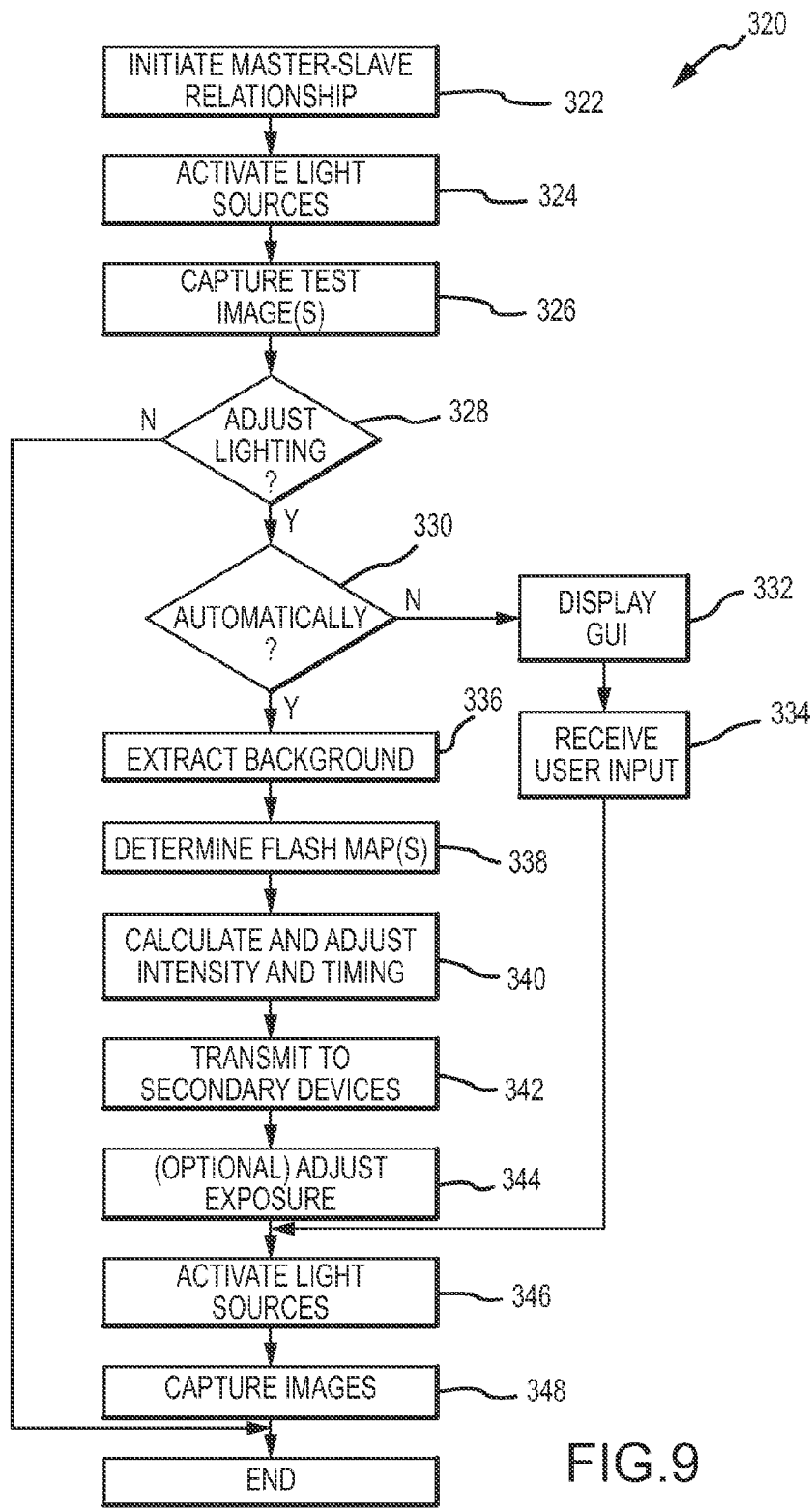
FIG. 9 is a flow chart illustrating an example method for modifying an illumination of a scene and capturing an image of the scene.

In addition to the GUI 240, the image capture device 100 or another device (e.g., laptop) may be used to adjust aspects of a captured image. An example method for adjusting the illumination and other image characteristics for the illumination system 200 will now be discussed. FIG. 9 is a flow chart illustrating an example method for adjusting aspects of a captured image. The method 320 may begin with operation 322 and the image capture device 100 may initiate a master-slave relationship with the secondary devices 202A-202C. As discussed above with respect to FIG. 5, this type of relationship allows the image capture device 100 to transmit control signals to the secondary devices 202A-202C. Additionally, the relationship may also allow the secondary devices 202A-202C to send signals to the image capture device 100 as well.

Once the master-slave relationship is initiated, the secondary devices 202A-202C may respond to signals from the image capture device 100. The method 320 may then proceed to operation 324 and the light sources 208 (and optionally light source 108) may be activated. As described in operation 306 in FIG. 7, the image capture device 100 may transmit a signal to activate the light sources 208 of the secondary devices 202A-202C and optionally may activate its own light source 108.

As the light sources 108, 208 are activated, the method 320 may proceed to operation 326 and the image capture device 326 may capture one or more test images. For example, in one embodiment, a one or more images may be captured by the image capture device 100 with the light sources 208 of the secondary devices 202A-202C illuminating the scene at varying intensities and/or times. This generally allows the image capture device 100 to capture images of the scene 210 with each secondary device 202A-202C activating its light source 208 independently and at different intensities. In another example, the image capture device 100 may capture images of the scene 210 with each of the secondary devices 202A-202C activating its light source 208 at the same time, but with varying intensities. The test images are captured by the image sensor 124 and may be evaluated by the user or the image capture device 100 to determine if certain parameters or settings should be adjusted, as described in more detail below.

After operation 326, the method 320 may proceed to operation 328 and the image capture device 100 may display an option permitting the user to adjust the lighting for the scene 210. Alternatively, as described below in more detail with respect to operation 330, the image capture device 100 may evaluate the image itself to determine if the lighting or other settings should be adjusted. Accordingly, either the user or the image capture device 100 may determine whether the image should be adjusted. If the illumination of the scene 210 (and thus a captured image) is not to be adjusted, the method 320 may proceed to the end of method 320 and the test image may be retained as the "final" image. In other words, the test image may be stored in the memory 134 or an option may be presented to the user to store the test image in the memory 134. Alternatively, if the illumination is not to be adjusted, the method 320 may proceed to operation 348 and a new image may be captured. This may allow the test images to be separate from the captured images, thus the test images may be locked out from adjustment by a user, have a reduced data amount, or so on.

If the illumination or another parameter of the scene 210 is to be adjusted in operation 328, the method 320 may proceed to operation 330. In operation 330, the image capture device 100 may determine whether the adjustments will be done automatically or by the user. For example, the image capture device 100 may present an option to the user to determine whether he or she would like to manually adjust the scene illumination or whether he or she may wish to have the image capture device 100 adjust the scene illumination. In another example, the image capture device 100 may have a certain setting for a particular application or user that may determine whether the image capture device 100 should do the adjustments or whether the user will be doing the adjustments.

If the user elects to make adjustments manually, the method 320 may proceed to operation 332 and the image capture device 100 may display the GUI 240. As the GUI 240 is displayed, the image capture device 100 may receive user input adjusting the illumination in the scene 210. For example, with reference to FIG. 8, the user may physically manipulate the controller 244 (e.g., if the device 100 includes an input mechanism), or may manipulate the controller 244 through the input mechanisms 112, 114. Similarly, the user may also determine which secondary device 202A-202C light source 208 will be manipulated, e.g., by selecting a particular indicator 246A-202C. Further, the user may physically change the position of the secondary devices 202AA-202C with respect to the scene 210.

It should be noted that, in some embodiments, the image capture device 100 may provide the user with assistance in adjusting the illumination of the scene 210. Referring briefly to FIG. 8, certain aspects of the captured image 248 on the GUI 240 may illuminate, change colors, move, or provide another type of indicator if a position or intensity of a particular light source 208 for a secondary device 202A-202C is positioned ineffectively (as determined by the processor 130). This may provide the user additional information when making changes to the location and/or intensity of the secondary devices 202A-202C. In some embodiments, the device 100 may perform a series of preprogrammed operations to cycle through lighting schemes provided by the secondary devices 202A-202C and show the user the image to be captured under each lighting scheme. The user may then select a particular test image from amongst the various displayed images. Once the user selection is complete, the image capture device 100 may adjust the flash map of each light source 208 accordingly, as described below.

Referring again to FIG. 9, if the adjustments are to done by the image capture device 100, the method 320 may proceed to operation 336. In operation 336 the processor 130 may analyze the one or more test images to determine and/or extract the background exposure. The background exposure may include background light sources 214, such as a lamp, sun, television, or the like. The background exposure may be determined by taking a test image in operation 324 prior to activating any of the system 200 light sources or may be determined by analyzing the various test images taken in operation 324 to extract the background image. For example, in each test image the intensity and duration of each light source 208 may be known, so the background light 214 may be determined by an analysis and comparison of various test images.

Once the background exposure is determined in operation 336, the method 320 may proceed to operation 338. In operation 338 the image capture device 100 may determine one or more flash or strobe maps or images. The flash maps may provide data with respect to scene 210 and the system 200 regarding how each particular secondary device 202A-202C may affect the overall captured image. In other words, when the light source 208 of a particular secondary device 202A-202C is activated at a certain intensity, the flash map may determine how it affects the overall captured image of the scene 210. Also, the image capture device 100 may receive feedback from each secondary device 202A-202C regarding its position and/or angle. In this manner, the image capture device 100 can better determine the flash map for each particular secondary device 202A-202C based on position, timing, intensity, and/or angle of the light source 208 for each device 202A-202C.

In one embodiment, multiple test images at multiple intensities may be captured by the image capture device 100 in order to create a high dynamic range flash map. It should be noted that in some embodiments, the test images may be stored at a lower resolution or smaller data file in the memory 134. This may allow the image capture device 100 to utilize the date in each test image, without overly burdening the memory 134. However, in other embodiments, the test images and flash maps may be stored as normal images within the memory 134.

After the flash map(s) are determined, the method 320 may proceed to operation 340 and the image capture device 100 may calculate and adjust the light source intensity and timing. For example, the image capture device 100 may utilize the flash map to determine how each particular secondary device 202A-202C may affect the overall captured image. Then, the processor 130 may adjust the light sources 208 for each secondary device 202A-202C (and optionally the light source 108 of the image capture device 100), in accordance with a previous user setting, based on an uniform illumination analysis, or the like.

In one example, the image capture device 100 may adjust the light sources 208 and/or position (by providing positioning instructions) of the secondary devices 202A-202C using heuristics such as maximizing overall brightness of the captured image while avoiding clipping, in order to select the proper adjustments for the system 200. "Clipping," as used herein, generally refers to when an intensity in a certain area of an image falls outside the minimum and maximum intensity which can be represented by the image sensor 124.

For example, the processor 130 may divide the captured test images into a series of quadrants or zones and then may assess the response for each captured test image in each quadrant. The intensity of the light source 208 for each secondary device 202A-202C (and optionally the light source 108) may then be the variables for each image. The processor 130 may then construct one or more linear equations to determine a desired result, e.g., with what settings for each device 202A-202C does the captured image go beyond a max value without clipping some percentage of the pixels.

In another example, the processor 130 may analyze certain objects within the scene with polarization or other imaging techniques to better determine how the light may need to be adjusted in order to best capture the scene 210. The aforementioned examples are some examples of a determination process and other determination processes are envisioned. Once the image capture device 100 has determined the desired adjustments for the secondary devices 202A-202C, the method 320 may proceed to operation 342. In operation 342, the image capture device 100 may transfer the desired adjustment data to each of the secondary devices 202A-202C. The image capture device 100 may transfer the data so that each of the secondary devices 202A-202C can make the adjustments on their own, or through the master-slave relationship, the image capture device 100 may adjust the secondary devices 202A-202C itself.

Further, in some embodiments, the image capture device 100 may display on the GUI 240 or on a display of the secondary devices 202A-202C directions for position data, so that one or more users may move the secondary devices 202A-202C in accordance with the desired scene illumination. In these embodiments, the image capture device 100 may also receive data corresponding the actual position and/or angle of the secondary devices 202A-202C. This may allow the image capture device 100 to dynamically adjust the positioning instructions for the secondary devices 202A-202C. For example, the positioning instructions may provide a green light and direction arrow on a display of each secondary device 202A-202C pointing in a direction the device 202A-202C is to be moved. Then, once the secondary device 202A-202C has reached the correct position, a red light may be displayed. Other indicators are possible as well. For example, the secondary devices 202A-202C could provide spoken directions, other displayed icons, or the like.

Once the secondary devices 202A-202C have been appropriately adjusted, the method 320 may proceed to operation 344. In operation 344 the image capture device 100 may optionally adjust the time that the exposure time. In other words, the time that the image sensor 124 may be exposed to light transmitted through the lens. For example, in some embodiments, the image capture device 100 may include a shutter covering the image sensor 124 until an image is going to be captured. In operation 344, the image capture device 100 may determine how long the shutter is raised to allow light from the lens 122 to encounter the image sensor 124. The exposure time affects the amount of light that may be transmitted through the lens 122 to the image sensor 124 and may be adjusted based on a preference of the user and/or a desired captured image appearance. Accordingly, the exposure time may be adjusted to control the background light level, the longer the exposure time, the brighter the background light level that may be captured in the image.

After operation 324 or after operation 334, the method 320 may proceed to operation 346 and the light sources 208 of the secondary devices 202A-202C and optionally, the light source 108 of the image capture device 100, may be activated. As the light sources 208 are activated, the method 320 may proceed to operation 348 and the image capture device 100 may capture an image of the scene 210. Light from the scene 210, as illuminated by the background light 214 and the secondary devices 202A-202C, may be transmitted through the lens 122 and captured by the image sensor 124. Once the image has been captured, the method 320 may return to operation 328 and the user or the image capture device 100 may determine whether the lighting may need to be adjusted again. However, once the desired image has been captured, the method 320 may end.

The method 320 and the system 200 may provide a number of different captured images. In one example, the range of images captured by the image capture device 100 may be represented by Eq. (1) listed below.

$$t_e * I_0 + a_1 * I_1 + a_2 * I_2 + \ldots a_n * I_n \qquad \text{Eq. (1)}$$

In Eq. (1), $t_e$ is the exposure period or exposure time, $I_0$ is the background image or background light, $a_i$ represents the various amplitudes (e.g., intensity) of the light sources 208 of the secondary devices 202A-202C, and $I_1$ to $I_n$ are the various test images that may be captured in operation 326. Accordingly, as the exposure time and various amplitudes and intensities of the secondary devices 202A-202C are modified, the capture images may be modified. Further, depending on the number of secondary sources 202A-202C, additional image ranges are possible.

The method 320 also provides a system for controlling and balancing external light sources for capturing an image. Some conventional digital cameras may include an internal xenon strobe or light source. These integrated light sources may generally include a separate photodiode for intensity and exposure control. When the diode signal integrates itself into the desired intensity level of the strobe, the strobe is extinguished. In these types of cameras, the exposure and/or intensity of the strobe cannot be controlled from the captured image as the strobe duration is typically shorter than the frame readout period for the image sensor. By contrast, the system 200 and method 320 as described herein allow the user to view how changes to position and intensity of each light source 208 may affect an image via the image capture device 100. Additionally, the light sources 208 may be digitally or electronically controlled, as opposed to a diode sensing an optical change and thus may be more easily corrected.

Furthermore, in conventional lighting systems including multiple strobes, the control process may be even more difficult. This is because each individual strobe may have a separate photodiode detector for control, however, the sum of a group of strobes cannot be automatically adjusted. Rather, a user generally has to adjust each strobe intensity manually through a process of trial and error, which depending on the strobes can be laborious and time extensive. By contrast, the illumination system 200 and method 320 allow the image capture device 100 itself to change each of the light sources 208, as well as allow a user to view how changes to certain light sources 208 may appear.

Remote Light Source

Figure 10:
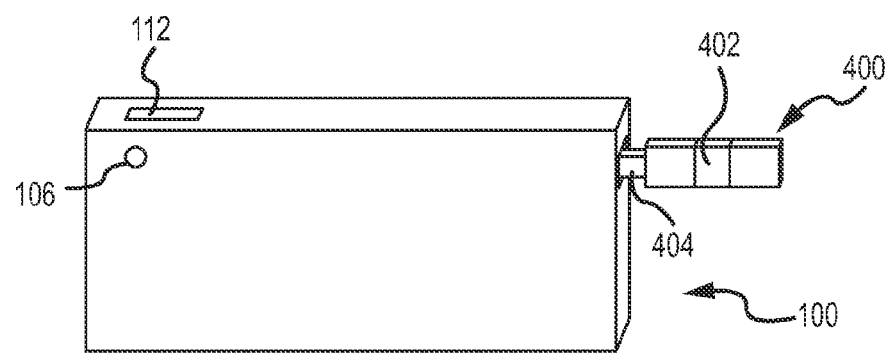
FIG. 10 is a rear perspective view of the image capture device of FIG. 1A including a remote light source.
Figure 11A:
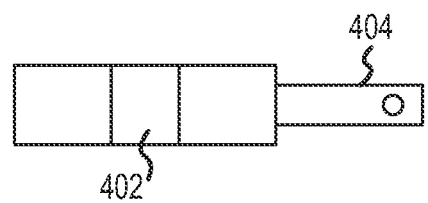
FIG. 11A is a front perspective view of a first embodiment of the remote light source.
Figure 11B:
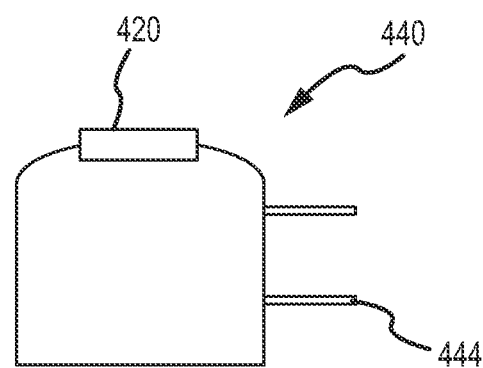
FIG. 11B is a front perspective view of a second embodiment of the remote light source.

In addition to the secondary devices 202A-202C, or as a secondary device 202A-202C, a remote light source may also be used to illuminate the scene 210. FIG. 10 is a rear perspective view of an embodiment of the image capture device and a remote light source 400 connected thereto. FIG. 11A is a perspective view of a first embodiment of the remote light source 400. FIG. 11B is a front perspective view of a second embodiment of a remote light source 440. The remote light source 400, 440 may include a light source 402, 420 and a connection mechanism 404, 444. The light source 402, 420 may be substantially the same as the light source 108, 208 in the image capture device 100 and the secondary devices 202A-202C, respectively.

The connection mechanism 404, 444 may be received within an input port 110 of the image capture device 100. For example, as shown in FIG. 11A, the connection mechanism 404 may be a universal serial bus plug. Alternatively or additionally, the connection mechanism 444 may be configured to be received within a wall outlet or other charging apparatus. For example, as shown in FIG. 11B, the connection mechanism 444 may include one or more prongs configured to be received within a wall outlet.

In certain embodiments, the remote light source 400, 440 may not be connected to the image capture device 100, but may be positioned similar to the secondary devices 202A-202C near the image capture device 100. In other examples, the remote light sources 400, 440 may be connected to the image capture device 100 when providing illumination to the scene 210. However, the remote light source 400, 440 may be positioned on the image capture device 100 spaced apart from the lens 122. Thus, the remote light source 400, 440 may provide illumination with a decreased change of red-eye illumination.

Further, the remote light source 400, 440 may be integrated or operably associated with a charging cable, data cable, or other type of connector for the image capture device 100. In these embodiments, the remote light source 400, 440 may be easy for a user to have when he or she wishes to take a photograph, as generally people may carry a charger for a specific electronic device when they take the electronic device to different places. On the contrary, a user may not typically remember to bring a removable flash for an electronic device, as he or she may not realize that he or she may want to take a photograph prior to leaving a house or the like.

The remote light source 400, 440 may be activated directly by the image capture device 100. For example, data may be communicated through the connector mechanism 404, 444. In other embodiments, the remote light source 400, 440 may be activated remotely by the image capture device 100. In these embodiments, the remote light source 400, 440 may receive and/or send signals to the image capture device 100 in order to receive a control signal and/or activate signal.

CONCLUSION

The foregoing description has broad application. For example, while examples disclosed herein may focus on utilizing a smart phone or mobile computing device, it should be appreciated that the concepts disclosed herein may equally apply to other image capturing devices and light sources. Similarly, although the illumination system may be discussed with respect to activating a series of light sources, the devices and techniques disclosed herein are equally applicable to any type of output. Accordingly, the discussion of any embodiment is meant only to be an example and is not intended to suggest that the scope of the disclosure, including the claims, is limited to these examples.

What is claimed is:

1. An electronic device to capture images comprising:
    a lens configured to collect light from a scene for an image capture device;
    an image sensor operatively coupled to the lens;
    a memory operatively coupled to the image sensor;
    a display operatively coupled to the memory;
    a communication mechanism configured to transmit and receive communication signals;
    a processor operatively coupled to the image sensor, the memory, the display and the communication mechanism, the processor configured to execute instructions stored in the memory to cause the processor to— transmit and receive, through the communication mechanism, first communication signals to establish communication with a second device, receive, through the communication mechanism, second communication signals from the second device indicating an initial position of the second device, represent the initial position in a graphical user interface on the display, transmit, through the communication mechanism, third communication signals to activate a light source of the second device, capture, subsequent to transmission of the third communication signals, a test image of the scene, analyze the test image to generate a flash map of the scene for the second device, determine, based at least in part on the flash map for the second device, a target position for the second device, display the scene in the graphical user interface with an indicator of the target location, receive, through the communication mechanism, fourth communication signals indicating the second device is located at the target position, transmit, through the communication mechanism and subsequent to reception of the fourth communication signals, fifth communication signals to reactivate the light source of the second device, capture, subsequent to transmission of the fifth communication signals, a second image of the scene, and store the second image in the memory.

2. The electronic device of claim 1, wherein the instructions stored in the memory to cause the processor to determine a target position comprise instructions to cause the processor to determine a target position so as to yield an image that has improved quality when compared to the test image captured at the initial position.

3. The electronic device of claim 1, wherein the instructions to cause the processor to transmit third communication signals comprise instructions to cause the processor to transmit, through the communication mechanism, third communication signals to activate a plurality of light sources of the second device.

4. The electronic device of claim 1, wherein the instructions to cause the processor to capture a test image comprise instructions to cause the processor to:

activate, subsequent to transmission of the third communication signals, one or more light sources of the image capture device; and capture, coincident with activation of the one or more light sources of the image capture device, the test image.

5. The electronic device of claim 4, wherein the instructions to cause the processor to analyze the test image further comprise instructions to cause the processor to generate a flash map of the scene for the image capture device.

6. The electronic device of claim 5, wherein the instructions to cause the processor to determine a target position for the second device comprise instructions to cause the processor to determine a target position for the second device based at least in part on the flash map for the second device and the flash map for the image capture device.

7. The electronic device of claim 1, wherein the instructions to cause the processor to receive fourth communication signals further comprise instructions to cause the processor to display, in the graphical user interface, movement of the second device from the initial position to the target position.

8. The electronic device of claim 1, wherein the instructions to cause the processor to receive fourth communication signals further comprise instructions to cause the processor to generate one or more of an audible notification and a visual notification.

9. The electronic device of claim 1, wherein the instructions to cause the processor to transmit fifth communication signals comprise instructions to cause the processor to transmit, through the communication mechanism and subsequent to reception of the fourth communication signals, fifth communication signals to change an intensity of the light source of the second device and, subsequently, to reactivate the light source of the second device.

10. A method executed by an image capture device to capture images comprising:

establishing communication with a second device;

receiving, subsequent to the establishing, first signals from the second device indicating an initial position of the second device;

representing the initial position of the second device in a graphical user interface on a display of the image capture device;

transmitting second signals to activate a light source of the second device;

capturing, subsequent to transmitting the second signals, a test image of a scene with the image capture device;

analyzing the test image to generate a flash map of the scene for the second device;

determining, based at least in part on the flash map for the second device, a target position for the second device;

displaying the scene in the graphical user interface with an indicator of the target location;

receiving third signals indicating the second device is located at the target position;

transmitting, subsequent to receiving the third signals, fourth signals to reactivate the light source of the second device;

capturing, subsequent to transmitting the fourth signals, a second image of the scene; and storing the second image in a memory of the image capture device.

11. The method of claim 10, wherein determining a target position comprises determining a target position so as to yield an image that has improved quality when compared to the test image captured at the initial position.

12. The method of claim 10, wherein capturing a test image comprises:

activating, subsequent to transmitting the second signals, one or more light sources of the image capture device; and capturing, coincident with activating the one or more light sources of the image capture device, the test image.

13. The method of claim 12, wherein analyzing the test image further comprises generating a flash map of the scene for the image capture device.

14. The method of claim 13, wherein determining a target position for the second device further comprises determining a target position for the second device based at least in part, on the flash map for the image capture device.

15. The method of claim 10, wherein receiving third signals further comprises displaying, in the graphical user interface, movement of the second device from the initial position to the target position.

16. The method of claim 10, wherein transmitting fourth signals comprises transmitting, subsequent to receiving the third signals, fourth signals to change an intensity of the light source of the second device and, subsequently, to reactivate the light source of the second device.

17. A non-transitory program storage device comprising instructions stored thereon to cause a processor in an image capture device to:
- transmit and receive, through a communication mechanism in the image capture device, first communication signals to establish communication with a second device;
- receive, through the communication mechanism, second communication signals from the second device indicating an initial position of the second device;
- represent the initial position in a graphical user interface on a display of the image capture device;
- transmit, through the communication mechanism, third communication signals to activate a light source of the second device;
- capture, subsequent to transmission of the third communication signals, a test image of a scene;
- analyze the test image to generate a flash map of the scene for the second device;
- determine, based at least in part on the flash map for the second device, a target position for the second device;
- display the scene in the graphical user interface with an indicator of the target location;
- receive, through the communication mechanism, fourth communication signals indicating the second device is located at the target position;
- transmit, through the communication mechanism and subsequent to reception of the fourth communication signals, fifth communication signals to reactivate the light source of the second device;
- capture, subsequent to transmission of the fifth communication signals, a second image of the scene, and
- store the second image in a memory of the image capture device.

18. The non-transitory program storage device of claim 17, wherein the instructions stored in the memory to cause the processor to determine a target position comprise instructions to cause the processor to determine a target position so as to yield an image that has improved quality when compared to the test image captured at the initial position.

19. The non-transitory program storage device of claim 17, wherein the instructions to cause the processor to capture a test image comprise instructions to cause the processor to:
- activate, subsequent to transmission of the third communication signals, one or more light sources of the image capture device; and
- capture, coincident with activation of the one or more light sources of the image capture device, the test image.

20. The non-transitory program storage device of claim 19, wherein:
- the instructions to cause the processor to analyze the test image further comprise instructions to cause the processor to generate a flash map of the scene for the image capture device; and
- the instructions to cause the processor to determine a target position for the second device comprise instructions to cause the processor to determine a target position for the second device based at least in part on the flash map for the second device and the flash map for the image capture device.

* * * * *